United States Patent [19]

Saito et al.

[11] Patent Number: 5,069,973

[45] Date of Patent: Dec. 3, 1991

[54] MAGNETIC RECORDING MEDIUM

[75] Inventors: Osamu Saito, Takatsuki; Kenji Sumiya, Suita, both of Japan

[73] Assignee: Hitachi Maxell, Ltd., Osaka, Japan

[21] Appl. No.: 302,043

[22] Filed: Jan. 26, 1989

Related U.S. Application Data

[63] Continuation of Ser. No. 857,321, Apr. 30, 1986, abandoned.

[30] Foreign Application Priority Data

May 1, 1985 [JP] Japan .................................. 60-94749

[51] Int. Cl.$^5$ .............................................. G11B 23/00
[52] U.S. Cl. .................................... 428/421; 428/422; 428/694; 428/695; 428/900
[58] Field of Search ............... 428/694, 695, 900, 421, 428/422

[56] References Cited

U.S. PATENT DOCUMENTS

| | | | |
|---|---|---|---|
| 4,188,434 | 2/1980 | Loran | 428/422 |
| 4,268,556 | 5/1981 | Pedrotty | 428/900 |
| 4,368,239 | 1/1983 | Nakajima et al. | 428/695 |
| 4,505,990 | 3/1985 | Dasgupta | 428/694 |
| 4,526,833 | 7/1985 | Burguette | 428/695 |
| 4,529,659 | 7/1985 | Hoshino | 428/447 |
| 4,536,444 | 8/1985 | Sumiya | 428/695 |

FOREIGN PATENT DOCUMENTS

| | | | |
|---|---|---|---|
| 58-159232 | 9/1983 | Japan . | |
| 0212809 | 10/1985 | Japan | 428/694 |
| 0246020 | 12/1985 | Japan | 428/694 |

*Primary Examiner*—Paul J. Thibodeau
*Attorney, Agent, or Firm*—Birch, Stewart, Kolasch & Birch

[57] ABSTRACT

A magnetic recording medium comprising a substrate, a magnetic layer formed on at least one surface of the substrate and a lubricant, which is present on or in the magnetic layer and comprises at least one of fluorine-containing solid compound of the formulae:

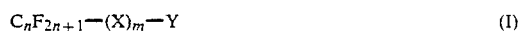

$$C_nF_{2n+1}-(X)_m-Y \qquad (I)$$

and

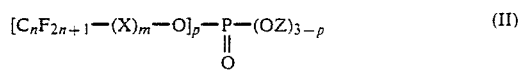

$$[C_nF_{2n+1}-(X)_m-O]_p-\underset{\underset{O}{\|}}{P}-(OZ)_{3-p} \qquad (II)$$

wherein X is a divalent group not containing fluorine, Y is a hydrophilic group or a monovalent group having a terminal carbon-carbon double bond, Z is a hydrogen atom or a metal atom, n is an integer of 3 or more, m is 0 or 1, and p is 2 or 3, which has a small coefficient of friction on the surface, improved durability and running stability.

6 Claims, No Drawings

MAGNETIC RECORDING MEDIUM

This application is a continuation of application Ser. No. 06/857,321, filed on Apr. 30, 1986, now abandoned.

FIELD OF THE INVENTION

The present invention relates to a magnetic recording medium such a magnetic recording tape, a magnetic disc and a magnetic card. More particularly, it relates to a magnetic recording medium comprising a lubricant on or in a magnetic layer.

BACKGROUND OF THE INVENTION

A magnetic recording medium comprising a substrate and a magnetic layer which is formed on the substrate and consists of a thin film of a metal or a metal oxide with high coercive force has better high density recording characteristics than one comprising a magnetic layer formed by coating and drying a magnetic coating composition, namely a magnetic coating layer, on the substrate, although the former has a very flat surface and a large coefficient of friction so that it is more easily abrased or damaged when it is slid against a magnetic head and/or a guide during recording or reproducing and has poor running stability resulting in increase of fluctuation of output.

Since high density recording is increasingly required, the magnetic recording medium comprising the magnetic coating layer is being improved so as to have a thin magnetic coating layer and more smooth surface so as to increase short wavelength characteristics. Thus, it is highly required for the magnetic layer to have better abrasion resistance.

To this end, it has been proposed to coat the surface of the magnetic layer with various lubricants to form a protective film with good lubrication, or to add the lubricant to the magnetic coating layer. Thereby, a coefficient of friction is reduced so that the abrasion resistance, durability and running stability are improved. Among the lubricants, fluorine-containing lubricants such as perfluoroalkyl polyether, tetrafluoroethylene telomer, and trifluorochloroethylene resin are reported to be particularly effective.

Since, however, the fluorine-containing lubricant has very weak interaction with the surface of the magnetic layer, it tends to become removed from the surface in use and its lubricating effect is not always demonstrated. In addition, under the circumstance where the magnetic recording medium is slid on the magnetic head at a high speed, viscosity resistance of the lubricant increases so that the running stability of the medium is deteriorated and, in turn, fluctuation of the output is increased. Furthermore, when the fluorine-containing lubricant is coated on the surface of the magnetic layer consisting of a thin layer of ferromagnetic metal or metal oxide, the recording medium sticks to the magnetic head or the guide and running of the medium is stopped if both surfaces of the magnetic layer and the magnetic head or the guide are extremely smooth.

SUMMARY OF THE INVENTION

One object of the present invention is to provide a magnetic recording medium having good abrasion resistance, durability and running stability.

Another object of the present invention is to provide a magnetic recording medium containing a lubricant which comprises a specific fluorine-containing compound on or in a magnetic layer.

Accordingly, the present invention provides a magnetic recording medium comprising a substrate, a magnetic layer formed on at least one surface of the substrate and a lubricant which is present on or in the magnetic layer and comprises at least one of fluorine-containing solid compounds of the formulae:

$$C_nF_{2n+1}-(X)_m-Y \qquad (I)$$

and $$[C_nF_{2n+1}-(X)_m-O]_p-\underset{\underset{O}{\|}}{P}-(OZ)_{3-p} \qquad (II)$$

wherein X is a divalent group not containing fluorine, Y is a hydrophilic group or a monovalent group having a terminal carbon-carbon double bond, Z is a hydrogen atom or a metal atom, n is an integer of 3 or more, m is 0 or 1, and p is 2 or 3.

DETAILED DESCRIPTION OF THE INVENTION

Since the fluorine-containing solid compound (I) or (II) has the hydrophilic group or the carbon-carbon double bond at the molecule end, the group and the double bond enhance affinity of the molecules with each other so that, on one hand, the compound tends to form aggregates and on the other hand, the molecules are adsorbed and oriented on the surface of the magnetic layer when coated on said surface, or form a dense lubricating layer which is hardly removed from the surface when the compound is contained in the magnetic layer.

Due to the above characteristics of the fluorine-containing compound (I) or (II), at least part of the molecules of the compound is stably fixed on the surface of the magnetic layer to form the lubricating thin layer when the compound is coated on or incorporated in the magnetic layer, and the molecules form a plenty of aggregates on the lubricating layer, which may behave like balls of a ball bearing. Thus, the fluorine-containing compound (I) or (II) has far better lubricating effect than the conventional lubricants. Since the aggregates have excellent affinity with the lubricating thin layer, they are hardly removed from the surface of the magnetic layer, and act as balls of the ball bearing so that, even when the magnetic recording medium runs at a high speed, the viscosity resistance of the lubricant does not increase and the surface of a magnetic layer and the surface on which the magnetic recording medium is slid, do not stick to each other even if both surfaces are extremely smooth. As a result, the running stability of the magnetic recording medium is maintained.

The fluorine-containing solid compound (I) or (II) does not flow at room temperature, for example at 20° C. or lower. That is, it is in a solid or semi-solid state at these temperatures.

X in the formula (I) or (II) is a divalent group not containing fluorine and preferably is an alkylene group, an alkylene oxide group, a polyalkylene oxide group or a group of the formula:

$$-SO_2-\underset{R_1}{\overset{\displaystyle |}{N}}-(R_2)_k- \qquad (III)$$

wherein $R_1$ is a hydrogen atom or an alkyl group, $R_2$ is an alkylene group, an alkylene oxide group or a polyalkylene oxide group, and k is 0 or 1.

Usually, X contains 1 to 100 carbon atoms. Preferably, the alkylene group for X contains 40 or less carbon atoms. The alkylene oxide for X contains 2 to 4 carbon atoms. The polyalkylene oxide group consists of $C_2$-$C_4$ alkylene oxides and does not have than 80 carbon atoms in total. When X is group (III), preferably, $R_1$ is a $C_1$-$C_{19}$ alkyl group, and $R_2$ is a $C_1$-$C_{20}$ alkylene group, a $C_2$-$C_4$ alkylene oxide group or a polyalkylene oxide group consisting of $C_2$-$C_4$ alkylene oxides and having not more than 40 carbon atoms.

Specific examples of the hydrophilic group for Y in the formula (I) are a hydroxyl group, a carboxyl group, a phosphoric acid group, a sulfonic acid group, metal salts of these groups, or a monovalent organic group having one of these groups and their metal, salts. An example of the monovalent group having a terminal carbon-carbon double bond is a (meth)acryloyloxy group of the formula:

wherein $R_6$ is a hydrogen atom or a methyl group.

In the present specification, the phosphoric acid group is used to represent a group of the formula:

and the sulfonic acid group is used to represent a group of the formula:

A metal salt of the hydroxyl group, the carboxyl group, the phosphoric acid group and the sulfonic acid group includes a salt with an alkali metal (e.g. sodium and potassium) and an alkaline earth metal, although salts with other metals such as iron, cobalt, nickel and chromium may be included.

Preferred examples of the monovalent organic group having one of these groups or its metal salt are groups of the formula:

wherein $R_3$ is a $C_2$-$C_4$ alkylene group, and j is an integer of 1 or more, preferably 1 to 20, and its salt with the metal as described above, and a group of the formula:

wherein $R_4$ and $R_5$ are both hydrogen atoms, or one is a hydrogen atom and the other is a methyl group, and its salt with the metal as described above.

In the fluorocarbon residue $C_nF_{2n+1}$ in the formula (I) or (II), n is preferably a number of 3 to 23.

The fluorine-containing compound (I) or (II) may not contain the group X. However, since the fluorocarbon chain $C_nF_{2n+1}$ is comparatively rigid, it is preferred for the compound (I) or (II) to contain the group X between the fluorocarbon chain and the group Y in the formula (I) or the phosphoric group in the formula (II) so as to impart flexibility to the compound, whereby the lubrication effect of the compound is further increased.

Among compounds (I) and (II), those wherein X is group (III) are preferred, since their properties are less influenced by temperature and/or humidity so that they are excellent in reducing the coefficient of friction.

The group Y in the formula (I) and the phosphoric acid group in the formula (II) contribute to the affinity of the molecules and keying of the compound on the magnetic layer surface. Among these some have better effects than others depending on the kind of the magnetic layer and/or the conditions of use of the magnetic recording medium. For example, when group Y is a hydroxyl group or its metal salt, or the monovalent organic group having a terminal carbon-carbon double bond, the coefficient of friction at room temperature and normal humidity is considerably decreased, and the jitter in an eight milimeter video tape deck is excellent. When group Y is a phosphoric acid group or its metal salt, the coefficient of friction at high temperatures and high humidity is effectively decreased and corrosion resistance is imparted to the magnetic layer consisting of ferromagnetic metal.

The lubricant to be used according to the present invention consists of the fluorine-containing compound (I) or (II) as such, although it may further contain various fluorine-containing liquid compounds, namely fluorine-containing compound which has flowability at room temperatures of, for example, at 20° C.

By the combination of a fluorine-containing liquid compound with solid compound (I) or, (II), the lubricating effect of the latter compound, which is similar to the balls of the ball bearing, is further enhanced so that the lubricity, durability and running stability of the magnetic recording medium are considerably increased, and characteristics required for high density recording (e.g. improvement of electromagnetic conversion characteristics and decrease of drop out) are also greatly improved.

Specific examples of the fluorine-containing liquid compound are those represented by the formula:

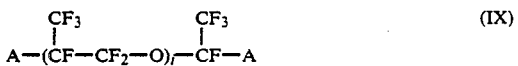

or

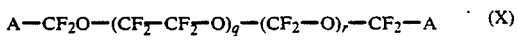

wherein A is a fluorine atom, a hydroxyl group, a carboxyl group, a phosphoric acid group, a sulfonic acid group, an isocyanate group or a metal salt of one of these groups, a monovalent organic group containing at least one of these groups and their metal salts or a monovalent organic group having a terminal carbon-carbon double bond. The group A at both ends may be the same or different. i is an integer of 10 to 100, q is an integer of 5 to 50, and r is an integer of 10 to 200.

The metal salt and the monovalent organic group for group A may be the same as those for group Y in the formula (I) or (II). In addition, the monovalent organic group for A may be a group of the formula:

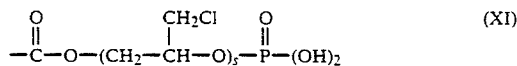

wherein s is an integer of 1 to 20, or its metal salt.

In a combination of the fluorine-containing solid compound (I) or (II) and the fluorine-containing liquid compound, the amount of the latter is not more than 99.9 % by weight, preferably not more than 95 % by weight, more preferably not more than 70 % by weight based on the total weight of both compounds. The lower limit of the liquid compound is 0.1 % by weight or higher. When the amount of the solid compound (I) or (II) is too small, the characteristic lubricating effects are not demonstrated and the object of the present invention is not achieved. In contrast, when the amount of the fluorine-containing liquid compound is too small, the effect of its addition is not demonstrated.

The magnetic layer of a magnetic recording medium of the invention may comprise a thin layer of a ferromagnetic metal or metal oxide, or a magnetic coating film comprising magnetic powder and a binder. The effect of a application of the lubricant is more significantly demonstrated when the magnetic layer comprises a thin layer of the ferromagnetic metal or metal oxide.

The ferromagnetic metal or metal oxide may be any one of the conventionally used and includes iron, cobalt, nickel, chromium and their alloys, and alloys of these metals with other metal elements or non-metal elements as well as their oxides.

The magnetic layer comprising a ferromagnetic metal or metal oxide is formed by a conventional method. For example, a thin layer of the ferromagnetic metal or metal alloy is formed by vacuum deposition, ion plating, sputtering, plating and the like, on a non-magnetic substrate such as a polyester film or an aluminum foil, sheet or plate. The thickness of the ferromagnetic metal or metal oxide thin layer is from 0.005 to 0.5 μm.

The magnetic layer comprising the ferromagnetic metal or metal oxide may be provided with a coating film on its surface to protect its surface. The protective layer includes an oxide layer formed by oxidizing the surface of the magnetic layer. The layer consisting of a hard metal such as titanium and bismuth or their oxides, a thin layer of an organic or inorganic compound (e.g. silane compounds) formed by vacuum deposition, sputtering or plasma polymerization. The protective layer may be a single layer or a laminated layer of these layers.

When the magnetic layer comprises the magnetic coating film, examples of the magnetic powder are metal oxide powder (e.g. $\gamma$-$Fe_2O_3$, $Fe_3O_4$, an intermediate oxide of these two oxide, Co-containing $\gamma Fe_2O_3$, Co-containing $Fe_3O_4$, $CrO_2$ and barium, nickel or lead ferrite), and magnetic metal powder (e.g. iron, cobalt, nickel, their alloys, alloys of these metals with other metal or a small amount of non-metal element). Specific examples of the binder are vinyl chloride-vinyl acetate copolymers, cellulose type resins, polyurethane, polyester resins, polyvinylbutyral, epoxy resins, polyols, and as a cross linking agent, a polyisocyanate compound.

The magnetic layer comprising the magnetic coating film can be formed by a conventional method. For example, a magnetic coating composition is prepared by mixing magnetic powder, binder and optionally at least one additive, coating the mixture onto a non-magnetic substrate such as a polyester film and followed by a drying step. The thickness of the magnetic coating film is preferably from 0.1 to 20 μm. As the optional additive, exemplified are abrasives, dispersing agents and antistatic agents.

The fluorine-containing solid compound (I) or (II) may be provided on or in the magnetic layer by various methods.

For example, the fluorine-containing solid compound (I) or (II) and optionally the fluorine-containing liquid compound are dissolved in a suitable solvent such as a fluorine-containing solvent or a mixture of said solvent with an alcohol (e.g. isopropanol), an ester (e.g. ethyl acetate), ketone (e.g. cyclohexanone), and applied on the substrate by, for example, coating or spray coating. Alternatively, said substrate is dipped in the solution to form the lubricating layer.

Another method comprises vaporizing the fluorine-containing compound in a vacuum chamber in which the substrate is placed and contacting the vaporized compound with the surface of the substrate to form the lubricating layer.

When the magnetic recording medium is a magnetic recording tape, a back coat is formed on the reverse surface of the non-magnetic substrate, and the fluorine-containing solid compound (I) or (II) is impregnated in the back coat, or the back coat is formed from the fluorine-containing solid compound (I) or (II). Then, plural sheets of the magnetic recording media each having the magnetic layer and the back coat are stucked, or in case of the magnetic tape, it is wound so as to contact the magnetic layer of one medium with the back coat of the next medium so that the fluorine-containing solid compound (I) or (II) which is exuded from or forms the back coat is transferred to the surface of the magnetic layer to form the lubricating layer. When the magnetic recording medium is a magnetic disc contained in a jacket, namely a floppy disc, the fluorine-containing compound is impregnated in a liner made of, for example, non-woven fabric attached on an inner surface of the jacket so that the compound is transferred from the jacket to the surface of the magnetic layer which makes contact with the liner.

When the lubricating layer is formed on the magnetic layer, the amount of the fluorine-containing solid compound (I) or (II) is preferably from 1 to 300 mg/m$^2$, more preferably from 2 to 200 mg/m$^2$.

Alternatively, when the magnetic layer is formed by coating and drying the magnetic coating composition on the substrate, the fluorine-containing solid compound (I) or (II) is added to the magnetic coating composition so that the formed magnetic layer contains the lubricant. Then, the contained lubricant is gradually exuded on the surface of the magnetic layer to demonstrate excellent lubrication effects.

When the lubricant is contained in the magnetic layer, the amount of the fluorine-containing solid compound (I) or (II) is 0.05 to 20 parts by weight, preferably 0.2 to 20 parts by weight per 100 parts by weight of the magnetic powder contained in the magnetic layer.

When the magnetic layer comprises the thin layer of the ferromagnetic metal or metal oxide, a rust preventive may be used together with the lubricant to prevent oxidation and corrosion. Any of the conventional rust preventives can be used according to the present invention. Among them, benzotriazole and its derivatives are particularly effective in combination with the fluorine-containing solid compound (I) or (II). The amount of the rust preventive varies with the particular one used. When benzotriazole or its derivative is used, it is used in an amount of 2 to 200 mg/m$^2$.

According to the present invention, the fluorine-containing solid compound (I) or (II) is present on or in the magnetic layer of the magnetic recording medium. The lubricating compound (I) or (II) has good affinity with the surface of the magnetic layer so that it is hardly removed from the surface. Also, the affinity between its molecules is good so that it forms aggregates on the surface of the magnetic layer which behave like the balls of the ball bearing. In addition, its viscosity resistance does not increase at the high sliding speeds between the magnetic recording medium and, for example, the magnetic head or the guide. Therefore, the lubricating effect lasts long, and the magnetic recording medium is imparted with an excellent abrasion resistance, durability and running stability and has superior electromagnetic conversion characteristics.

The present invention will be explained further in detail by the following Examples, wherein "parts" are "parts by weight".

EXAMPLE 1

A non-magnetic substrate made of a polyethylene film of 11 μm in thickness subjected to bombarding in an argon atmosphere to treat its surface by a conventional method and set in a vacuum deposition apparatus. Then, cobalt was vacuum deposited on the surface of the substrate under reduced pressure of $5 \times 10^{-4}$ Torr to form a layer of cobalt of 0.1 μm in thickness.

On the surface of the cobalt layer, a solution of the fluorine-containing solid compound (I) wherein n is 8, m is 1 (one), X is a methylene group ($-CH_2-$), Y is a carboxyl group (2 parts) in trichlorotrifluoroethane (98 parts) was coated so that the amount of unvolatile components on the surface was 100 mg/m$^2$, and dried. The substrate with the cobalt layer and the lubricant layer was cut to produce a magnetic recording tape having a predetermined width.

EXAMPLE 2

In the same manner as in Example 1 but using as a fluorine-containing compounds, the fluorine-containing solid compound (I) wherein n is 8, m is 1 (one), X is a group of the formula:

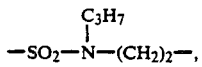

Y is a phosphoric acid group, a magnetic recording tape was produced.

EXAMPLE 3

In the same manner as in Example 1 but using, as fluorine-containing compound, the fluorine-containing solid compound (I) wherein n is 10, m is 1 (one), X is an ethylene group ($-CH_2CH_2-$) and Y is a sodium sulphonate group (1.6 parts) and the fluorine-containing liquid compound (IX) wherein one of A is a fluorine atom, the other of A is a carboxylic acid and i is 30 (0.4 part), a magnetic recording tape was produced.

EXAMPLE 4

In the same manner as in Example 1 but using, as fluorine-containing compounds, the fluorine-containing solid compound (1) wherein n is mainly 14, m is 1 (one), X an ethylene group and Y is a group of the formula: $-O-(CH_2CH_2O)_2-H$ (1 part) and the fluorine-containing liquid compound (X) wherein both A are fluorine atoms, q is 60 and r is 120 (1 part), a magnetic recording tape was produced.

EXAMPLE 5

In the same manner as in Example 1 but using, as fluorine-containing compounds, the fluorine-containing solid compound (I) wherein n is mainly 12, m is 1 (one), X is an ethylene group and Y is a group of the formula: $-O-CO-CH=CH-COOH$ (1.2 parts) and the fluorine-containing liquid compound (X) wherein both A are fluorine atoms, q is 12 and r is 24 (0.8 part), a magnetic recording tape was produced.

EXAMPLE 6

In the same manner as in Example 1 but using, as fluorine-containing compounds, the fluorine-containing solid compound (I) wherein n is mainly 12, m is 0 (zero) and Y is an acryloyloxy group (1.6 part) and the fluorine-containing liquid compound (IX) wherein both A are fluorine atoms and i is 20 (0.4 part), a magnetic recording tape was produced.

EXAMPLE 7

In the same manner as in Example 1 but using, as a solution of the fluorine-containing compounds, a solution of the fluorine-containing solid compound (I) wherein n is 12 on the average, m is 1 (one), X is an ethylene group and Y is a hydroxyl group (1 part) and the fluorine-containing liquid compound (IX) wherein both A are fluorine atoms and i is 70 (1 part) in a mixed solvent of trichlorotrifluoroethane (49 parts) and isopropanol (49 parts), a magnetic recording tape was produced.

EXAMPLE 8

In the same manner as in Example 1 but using, as fluorine-containing compounds, the fluorine-containing solid compound (I) wherein n is 14 on the average, m is 1 (one), X is an ethylene group and Y is an acryloyl group (1 part) and the fluorine-containing liquid compound (X) wherein both A are fluorine atoms, q is 13 and r is 23 (1 part), a magnetic recording tape was produced.

EXAMPLE 9

In the same manner as in Example 1 but using, as fluorine-containing compounds, the fluorine-containing solid compound (I) wherein n is 8, m is 1 (one), X is a group of the formula:

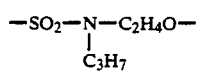

and Y is a phosphoric acid group (1 part) and the fluorine-containing liquid compound (X) wherein both A are fluorine atoms, q is 13 and r is 23 (1 part), a magnetic recording tape was produced.

EXAMPLE 10

In the same manner as in Example 1 but using, as fluorine-containing compounds, the fluorine-containing solid compound (I) wherein n is 8, m is 1 (one), X is a methylene group and Y is a carboxyl group (1 part) and the fluorine-containing liquid compound (IX) wherein one of A is a fluorine atom and i is 50 (1 part), a magnetic recording tape was produced.

EXAMPLE 11

In the same manner as in Example 1 but using, as fluorine-containing compounds, the fluorine-containing solid compound (I) wherein n is 14 on the average, m is 1 (one), X is an ethylene group and Y is an acryloyloxy group (1.4 part) and the fluorine-containing liquid compound (X) wherein one of A is a fluorine atom, the other of A is a carboxyl group, q is 30 and r is 60 (0.6 part), a magnetic recording tape was produced.

EXAMPLE 12

In the same manner as in Example 1 but using, as fluorine-containing compounds, the fluorine-containing solid compound (I) wherein n is 10 on the average, m is 1 (one), X is an ethylene oxide group and Y is a phosphoric acid group (0.6 part) and the fluorine-containing liquid compound (X) wherein one of A is a fluorine atom, the other of A is a group of the formula:

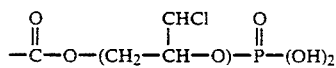

q is 60 and r is 120 (1.4 part), a magnetic recording tape was produced.

EXAMPLE 13

In the same manner as in Example 1 but using, as a solution of fluorine-containing compounds, a solution of the fluorine-containing solid compound (I) wherein n is 16 on the average, m is 1 (one), X is an ethylene group and Y is an acryloyloxy group (0.7 part), the fluorine-containing solid compound (I) wherein n is 8, m is 1 (one), X is a group of the formula:

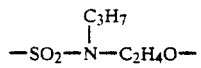

Y is a phosphoric acid group (0.7 part) and the fluorine-containing liquid compound (X) wherein both A are fluorine atoms, q is 20 and r is 40 (0.7 part) in trichlorotrifluoroethane (97.9 parts), a magnetic recording tape was produced.

EXAMPLE 14

In the same manner as in Example 1 but using, as fluorine-containing compounds, the fluorine-containing solid compound (I) wherein n is 12 on the average, m is 1 (one), X is a group of the formula:

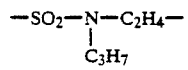

and Y is an acryloyloxy group (1 parts) and the fluorine-containing liquid compound (X) wherein both A are fluorine atoms, q is 30 and r is 60 (1 part), a magnetic recording tape was produced.

EXAMPLE 15

In the same manner as in Example 1 but using, as fluorine-containing compounds, the fluorine-containing solid compound (I) wherein n is mainly 12, m is 1 (one), X is an ethylene group and Y is a group of the formula: —OP(=O)—(ONa)$_2$ (1.6 part) and the fluorine-containing liquid compound (X) wherein both A are fluorine atoms, q is 30 and r is 60 (0.4 part), a magnetic recording tape was produced.

EXAMPLE 16

In the same manner as in Example 1 but using, as fluorine-containing compounds, the fluorine-containing solid compound (II) wherein q is 2, n is mainly 10, m is 1 (one), X is an ethylene group and Z is a hydrogen atom (1.6 part) and the fluorine-containing liquid compound (IX) wherein both A are fluorine atoms and i is 30 (0.4 part), a magnetic recording tape was produced.

EXAMPLE 17

In the same manner as in Example 1 but using, as fluorine-containing compounds, the fluorine-containing solid compound (II) wherein q is 3, n is mainly 12, m is 1 (one), X is a group of the formula:

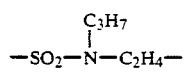

Z is a hydrogen atom (1 part) and the fluorine-containing liquid compound (X) wherein both A are fluorine atoms, q is 30 and r is 60 (1 part), a magnetic recording tape was produced.

EXAMPLE 18

In the same manner as in Example 7 but adding benzotriazole (0.5 part) to the solution of the fluorine-containing compounds and coating the solution so that the amount of the unvolatile components on the surface was 50 mg/m$^2$, a magnetic recording tape was produced.

EXAMPLE 19

The cobalt layer was formed on the surface of the substrate in the same manner as in Example 1 and then oxidized to form a cobalt oxide layer. Thereafter, on the cobalt oxide layer, tetrafluoroethylene was plasma polymerized for 5 minutes by flowing tetrafluoroethylene at a flow rate of 500 ml/min. under 0.5 Torr to form a film of polytetrafluoroethylene (PTFE) on the surface. On the PTFE surface, a solution of the fluorine-containing solid compound (I) wherein n is 12 on the average, m is 1 (one), X is an ethylene group and Y is a hydroxyl group (1.4 part) and the fluorine-containing liquid compound (IX) wherein one of A is a fluorine atom and the other of A is a carboxyl group and i is 80 (0.6 part) in trichlorotrifluoroethane (98 parts) was coated so that the amount of the unvolatile components on the surface was 80 mg/m$^2$ and dried. The coated substrate was cut to produce a magnetic recording tape.

EXAMPLE 20

On a back surface of the substrate on the surface of which the cobalt layer had been formed in the same manner as in Example 1, there was coated a back coat composition comprising the fluorine-containing solid compound (I) wherein n is 10 on the average, m is 1 (one), X is an ethylene group and Y is an methacryloyloxy group (2.8 parts), the fluorine-containing liquid compound (X) wherein one of A is a fluorine atom, the other of A is a carboxyl group, q is 100 and r is 200 (1.2 part), a vinyl chloride-vinyl acetate copolymer having hydroxyl groups (Vinylite VAGH manufactured by UCC, USA) (50 parts), ZnO powder having an average particle size of 0.2 μm (75 parts), methyl ethyl ketone (650 parts) and n-heptane (300 parts) followed by drying to form a back coat of 2 μm in thickness. Then, the coated substrate was cut to produce a magnetic recording tape having a predetermined width.

EXAMPLE 21

On a non-magnetic substrate made of a polyester film of 12 μm in thickness, there was coated a magnetic coating composition comprising iron powder (average longer axis of 0.3 μm, average axis ratio of 10, a specific surface area (by nitrogen adsorption method) of 50 m$^2$/g) (78 parts), carbon black (average particle size of 30 mμ) (5 parts), nitrocellulose (Trade name H1/2 manufactured by Asahi Chemical) (10 parts), polyurethane elastomer (12 parts), methyl ethyl ketone (100 parts) and n-heptane (50 parts) and dried to form a magnetic layer of 4 μm in thickness. On the surface of the magnetic layer, a solution of the fluorine-containing solid compound (I) wherein n is 12 on the average, m is 1 (one), X is an ethylene group and Y is a hydroxyl group (1.2 part) and the fluorine-containing liquid compound (X) wherein one of A is a fluorine atom, the other of A is a carboxyl group, q is 30 and r is 60 (0.8 part) in a mixed solvent of trichlorotrifluoroethane (49 parts) and isopropanol (49 parts) was coated on the magnetic layer so that the amount of the unvolatile components on the surface was 100 mg/m$^2$ followed by drying. Then, the coated substrate was cut to produce a magnetic tape having a predetermined width.

COMPARATIVE EXAMPLE 1

In the same manner as in Example 1 but using as a fluorine-containing compound, tetrafluoroethylene telomer, a magnetic recording tape was produced.

COMPARATIVE EXAMPLE 2

In the same manner as in Example 19 but using as a fluorine-containing compound, trifluorochloroethylene resin powder, a magnetic recording tape was produced.

COMPARATIVE EXAMPLE 3

In the same manner as in Example 1 but using as a fluorine-containing compound, the fluorine-containing liquid compound (IX) wherein both A are fluorine atoms and i is 80, a magnetic recording tape was produced.

COMPARATIVE EXAMPLE 4

In the same manner as in Example 1 but using as a fluorine-containing compound, the fluorine-containing liquid compound (X) wherein both A are fluorine atoms, q is 60 and r is 120, a magnetic recording tape was produced.

COMPARATIVE EXAMPLE 5

In the same manner as in Example 21 but using as a solution of a fluorine-containing compound, a solution of the fluorine-containing liquid compound (X) wherein one of A is a fluorine atom, the other of A is a carboxyl group, q is 30 and r is 60 in a mixed solvent of trichlorotrifluoroethane (49 parts) and isopropanol (49 parts), a magnetic recording tape was produced.

The magnetic recording tapes produced in Examples and Comparative Examples were examined for a coefficient of friction of the magnetic layer, durability and jitter as follows:

Coefficient of friction

Around a peripheral surface of a steel made cylindrical pin of 4 mm in diameter (surface roughness of 0.2 S), a magnetic recording tape is placed at an angle of 150° with facing the magnetic layer surface with the cylinder surface. Then, one end of the tape is pulled at a rate of 1.4 cm/sec. with applying a load of 21 g to the other end of the tape. After the tape is pulled one hundred times, a coefficient of friction of the surface of the magnetic layer is measured.

Durability

A magnetic recording tape is reproduced at 60° C., 90 %RH with a head load of 5 g at a running speed of 0.048 m/sec. The number of runnings after which output is decreased by 3 dB from the initial output is recorded.

Jitter

A magnetic recording tape is set in a standard video tape recorder and run at a running speed of 1.4 cm/sec. with applying tension of 6 g to record and reproduced color bar signals over a tape length of 5 m, during which a jitter value is recorded with a jitter meter.

The results are shown in following Table.

TABLE

| | Coefficient of friction | Durability (Runs) | Jitter (μs) | |
|---|---|---|---|---|
| | | | One run | 100 runs |
| Example 1 | 0.32 | 875 | 1.41 | 2.37 |
| Example 2 | 0.30 | 1,050 | 1.53 | 2.05 |
| Example 3 | 0.30 | 980 | 1.43 | 1.78 |
| Example 4 | 0.27 | 1,230 | 1.28 | 1.37 |
| Example 5 | 0.29 | 890 | 1.39 | 1.42 |
| Example 6 | 0.28 | 1,340 | 1.35 | 1.35 |
| Example 7 | 0.25 | 1,080 | 1.32 | 1.35 |
| Example 8 | 0.29 | 1,100 | 1.34 | 1.38 |
| Example 9 | 0.27 | 1,240 | 1.26 | 1.31 |
| Example 10 | 0.29 | 975 | 1.41 | 1.75 |
| Example 11 | 0.27 | 1,130 | 1.21 | 1.27 |
| Example 12 | 0.31 | 860 | 1.45 | 2.13 |
| Example 13 | 0.28 | 1,303 | 1.29 | 1.32 |
| Example 14 | 0.27 | 1,250 | 1.28 | 1.30 |
| Example 15 | 0.30 | 1,020 | 1.38 | 1.47 |
| Example 16 | 0.31 | 930 | 1.56 | 1.73 |
| Example 17 | 0.33 | 885 | 1.55 | 1.77 |
| Example 18 | 0.34 | 878 | 1.58 | 1.87 |
| Example 19 | 0.28 | 1,270 | 1.23 | 1.30 |
| Example 20 | 0.30 | 915 | 1.30 | 1.65 |
| Example 21 | 0.31 | 1,350 | 1.08 | 1.29 |
| Com. Ex. 1 | 0.25 | 783 | 2.75 | 5.61 |
| Com. Ex. 2 | 0.42 | 490 | 4.12 | 5.32 |
| Com. Ex. 3 | 0.32 | 670 | 2.37 | 3.89 |
| Com. Ex. 4 | 0.30 | 745 | 2.46 | 3.56 |
| Com. Ex. 5 | 0.31 | 778 | 3.02 | 3.89 |

As is apparent from the above results, the magnetic recording tapes according to the present invention have small coefficients of friction of the magnetic layer and excellent durability and also their jitter is less deteriorated after running. On the contrary, the magnetic recording tape using the conventional fluorine-containing lubricant such as tetrafluoroethylene telomer (Comparative Example 1), trifluorotrichloroethylene resin (Comparative Example 2) and perfluoroalkylpolyether (Comparative Examples 3 to 5) is inferior in at least one of the coefficient of friction, durability and jitter to the magnetic recording tape of the present invention.

Among the magnetic recording tapes of the present invention, those produced in Examples 2, 9, 12, 13, 15, 16, 17 and 19 had better corrosion resistance.

What is claimed is:

1. A magnetic recording medium comprising a substrate, a magnetic layer formed on at least one surface of said substrate, and a lubricant, said lubricant being present on or in said magnetic layer, and said lubricant comprises at least one of a fluorine-containing solid compound of the formula:

$$C_nF_{2n+1}-(X)_m-Y \quad (I)$$

and $$(C_nF_{2n+1}-(X)_m-O)_p-\underset{\underset{O}{\|}}{P}-(OZ)_{3-p} \quad (II)$$

$$C_nF_{2n+1}-(X)_m-Y \quad (I)$$

and $$[C_nF_{2n+1}-(X)_m-O]_p-\underset{\underset{O}{\|}}{P}-(OZ)_{3-p} \quad (II)$$

wherein X is a divalent group not containing fluorine, Y is a hydrophilic group or a monovalent group having a terminal carbon-carbon double bond, Z is a hydrogen atom or a metal atom, n is an integer of 3 or more, m is 0 or 1, and p is 2 or 3, provided that, in formula (I), when m is 0, Y is a phosphoric acid group, an acryloyloxy group, metal salts of these groups or a monovalent organic group including one of these groups, or a metal salt thereof.

2. The magnetic recording medium according to claim 1, wherein Y is a phosphoric acid group or a metal salt thereof.

3. The magnetic recording medium according to claim 1, wherein Y is a monovalent organic group of the formula:

$$-\underset{\underset{O}{\|}}{O}\underset{}{C}-\underset{R_4}{C}=\underset{R_5}{C}-COOH$$

wherein one of $R_4$ and $R_5$ is a hydrogen atom and the other is a methyl group or both are hydrogen atoms, or a metal salt thereof.

4. The magnetic recording medium according to claim 1, wherein the magnetic layer comprises a thin layer of a ferromagnetic metal or metal oxide, and the lubricant further comprises benzotriazole.

5. The magnetic recording medium according to claim 1, wherein Y is an acryloyloxy group, when m is 0.

6. The magnetic recording medium according to claim 1, wherein said magnetic layer is a thin layer of a ferromagnetic metal or metal oxide, and wherein said lubricant further comprises at least one fluorine-containing liquid compound and benzotriazole.

* * * * *